United States Patent [19]

Rawlings, III

[11] Patent Number: 5,479,656
[45] Date of Patent: Dec. 26, 1995

[54] METHOD AND SYSTEM FOR MAXIMIZING DATA FILES STORED IN A RANDOM ACCESS MEMORY OF A COMPUTER FILE SYSTEM AND OPTIMIZATION THEREFOR

[76] Inventor: Joseph H. Rawlings, III, 7427 SW. 34th, Portland, Oreg. 97219

[21] Appl. No.: 882,430

[22] Filed: May 13, 1992

[51] Int. Cl.⁶ .............................. G06F 12/00; G06F 13/00
[52] U.S. Cl. ................... 395/497.02; 364/DIG. 1; 364/DIG. 2; 395/600
[58] Field of Search .................... 395/600, 400, 395/425; 364/DIG. 1, DIG. 2

[56] References Cited

U.S. PATENT DOCUMENTS

| | | | |
|---|---|---|---|
| 4,456,971 | 6/1984 | Fukuda et al. | 364/DIG. 2 |
| 4,575,827 | 3/1986 | Kulakowski | 365/230 |
| 4,791,564 | 12/1988 | Takai | 364/DIG. 1 |
| 4,792,896 | 12/1988 | McLean et al. | 364/200 |
| 4,896,262 | 1/1990 | Wayama et al. | 364/DIG. 1 |
| 4,953,122 | 8/1990 | Williams | 364/900 |
| 4,958,315 | 2/1990 | Balch | 364/DIG. 2 |
| 5,151,990 | 9/1992 | Allen et al. | 395/650 |
| 5,226,168 | 7/1993 | Kobayashi et al. | 395/800 |
| 5,269,019 | 12/1993 | Peterson et al. | 395/600 |

*Primary Examiner*—Thomas G. Black
*Assistant Examiner*—Jean R. Homere
*Attorney, Agent, or Firm*—Marger, Johnson, McCollom & Stolowitz

[57] ABSTRACT

A computer file system mechanism to use data port storage efficiently wherein lost or unused storage space is minimized and use of available storage maximized. The data port file system may be used as an augmentation of existing file system mechanisms or in complete replacement thereof. The data port file system may be implemented such that the information required to maintain the file system is always updated to the data port or such that the information required to maintain the file system is always located in system memory during computer operations. The data port file system may be implemented such that both methods are used.

9 Claims, 21 Drawing Sheets

Trailing Edge Optimization Using
MemBlock Program Objects Multiply Linked List

File Fragmentation
Initial State

File C Deleted

File B Rewritten, Insufficient Free Space

File B Rewritten, Exact Free Space

File B Rewritten, Excess Free Space

Sector Size Comparison Illustrating Wasted Disk Space

| Storage Unit | Sector comparison (where x is wasted space) | | |
|---|---|---|---|
| 512-Byte Sector | | | xxxxxxxxxxxxxxxxxxxx |
| 8-Byte Sector | | x | Free space |

Figure 1

MemBlock Data Structure

Definitions: (Implementation Dependent, examples only)

Int8        An 8 bit integer.
    UInt16      A 16 bit unsigned integer
    UInt32      A 32 bit unsigned integer
    Boolean     A logical TRUE or FALSE
    structure     A program object structure definition
    *             Indicates variable is a pointer

```
structure MemBlock {
    Uint16              StartPage;
    UInt16              StartOffset;
    UInt16              BlockPages;
    Uint16              LastPageLength;
    Int8                BytesLastParagraph;
    Boolean             Free;
    UInt32              IndexNumber;        /* init & sync */
    structure MemBlock  *NextMemBlock;
    structure MemBlock  *PreviousMemBlock;
}
```

Figure 2

**New 64 MB Data Port
Initial MemBlock**

{
    MemBlock_Pointer    First;

First.StartPage = 0;
    First.StartOffset = 0;
    First.BlockPages = 128;
    First.LastPageLength = 0;
    First.BytesLastParagraph; = 0;
    First.Free = TRUE;
    First.IndexNumber = 0;
    First.NextMemBlock = NULL;
    First.PreviousMemBlock = NULL;
}

Figure 3

**MemBlock Linked List
64-MB Data Port
Single 72,345 Byte File Stored**

{
    MemBlock_Pointer    First, Second;

First.StartPage = 0;
    First.StartOffset = 0;
    First.BlockPages = 0;
    First.LastPageLength = 9044;
    First.BytesLastParagraph; = 1;
    First.Free = FALSE;
    First.IndexNumber = 0;
    First.NextBlock = Second;
    First.PreviousBlock = NULL;

Second.StartPage = 0;
    Second.StartOffset = 9045;
    Second.BlockPages = 127;
    Second.LastPageLength = 56492;
    Second.BytesLastParagraph; = 0;
    Second.Free = TRUE;
    Second.IndexNumber = 1;
    Second.NextBlock = NULL;
    Second.PreviousBlock = First;
}

Figure 4

```
/* Function SplitMemBlock()  Used to split a MemBlock into two
portions. Returns pointer to new MemBlock structure.  Returns NULL
on error. */

MemBlock_Pointer  SplitMemBlock(
MemBlock_Pointer  MemBlock,
integer           pages,length)
{
MemBlock_Pointer  NewMem;
integer           oddpage,offset;
long_integer      temp;

/* First, allocate a new MemBlock program object, testing for and
indicating any failure. */

NewMem=(MemBlock_Pointer)malloc(sizeof(MemBlock);
if (NewMem == NULL) {
    errno = OUT_OF_MEMORY; return (NULL);}

/* Compute and assign starting address and offset for the new
MemBlock.  Page size must be considered to correct for overflow. */ temp = MemBlock.StartOffset + length;
oddpage = temp / PAGESIZE;
offset = temp % PAGESIZE; /* Modulo division */

NewMem.StartPage = MemBlock.StartPage + pages + oddpage;
NewMem.StartOffset = offset;

/* Compute length and pages data for the new MemBlock.  If the new
LastPageLength of the original MemBlock is larger that the previous
LastPageLength, the value of BlockPages in the new MemBlock will
require decrementing.  Use the oddpage variable to determine the
need. */ if (MemBlock.LastPageLength < length) {
    oddpage = 1;
    temp = MemBlock.LastPageLength + PAGESIZE - length;}
else {
    oddpage = 0;
    temp = MemBlock.LastPageLength - length;
}
```

Figure 5a

```
/* Function SplitMemBlock()  Continued */

NewMem.LastPageLength = temp;
NewMem.Blockpages = MemBlock.BlockPages - (pages + oddpage);

/* Next, fix up the multiply linked list inserting the new MemBlock.
*/

NewMem.NextMemBlock = MemBlock.NextMemBlock;
NewMem.NextMemBlock.PreviousMemBlock = NewMem;
NewMem.PreviousMemBlock = MemBlock;
MemBlock.NextBlock = NewMem;

/* Return the pointer to the new MemBlock. */ return (NewMem);
}
```

Figure 5b

```
/* Subroutine FreeMemBlock()  When a MemBlock becomes free, this
function first examines neighboring blocks and combines any free
neighbors found. */

Void       FreeMemBlock(
MemBlock_Pointer MemBlock)
{
/* First, look for forward free MemBlocks */ while (MemBlock.PreviousMemBlock.Free) {
   MemBlock = CombineMemBlocks (MemBlock.PreviousMemBlock,MemBlock);
   }

/* Next, look for reverse free MemBlocks. */ while (MemBlock.NextMemBlock.Free) {
   MemBlock = CombineMemBlocks (MemBlock,MemBlock.NextMemBlock);
   }

/* Finally, set the state of the resultant MemBlock to free. */

MemBlock.Free = TRUE;
}
```

Figure 6

```
/* Function CombineMemBlocks()  Used to combine neighboring
MemBlocks.  Returns a pointer to the combined MemBlock. Returns NULL
on error. */ include "filesys.h"
define   PAGESIZE = 65536 /* Size of page in paragraphs */

MemBlock_Pointer CombineMemBlocks(First,Second)
MemBlock_Pointer First,Second;
{
integer      newpages,newlen,temp;
long_interger     len;
MemBlock_Pointer tempMB;

/* If the NextMemBlock pointer of the first is not equal to the
second, the MemBlocks are not ordered.  If the NextMemBlock pointer
of the second does is not equal to the first, the MemBlocks are not
neighbors, indicate error and return.  If they are out of order
neighbors, put them into the correct order. */ if (First.NextMemBlock != Second)) {
    if (Second.NextMemBlock != First)
        {error = MemBlocks_Not_Neighbors; return (NULL);}
    else {tempMB = First;
        First = Second;
        Second = tempMB;}
    }

/* Compute combined size of the two MemBlocks.  First compute the
sum of the two LastPageLength indicator. */ len = First.LastPageLength + Second.LastPageLength;

/* Set a variable equal to the combined size divided by the page
size.  The variable will indicate whether a full page has been
gained. */ temp = len / PAGESIZE;
```

Figure 7a

```
/* Function CombineMemBlocks() Continued */

/* Add the BlockPages of the second MemBlock plus the overflow
indicator to the first MemBlock's BlockPages. */

First.BlockPages += Second.BlockPages + temp;

/* Computer the new LastPageLength by dividing the combined length
modulo the PAGESIZE.*/

First.LastPageLength = len % PAGESIZE;

/* Fix up the multiply linked list so that the second MemBlock is no
longer a member of the list. */

First.NextMemBlock = Second.NextMemBlock;
First.NextMemBlock.PreviousMemBlock = First;

/* Free the second MemBlock and return pointer to the first. */

Free ((char *) Second);
return (First);
}
```

Figure 7b

```
/* Function GetMemBlockLenth(MemBlock)
 *
 * Returns the size of the MemBlock in Paragraphs
 */ integer    GetMemBlockLength (MemBlock)
MemBlock_Pointer MemBlock;
{
integer temp;

/* Computer the number of paragraphs represented by the number of
pages contained in the MemBlock using the BlockPages variable. */ temp = MemBlock.Blockpages * PARAGRAPHS_PER_PAGE;

/* Next add the paragraphs indicated in LastPageLength. */ temp += MemBlock.LastPageLength;

/* And return the value indicating the number of paragraphs */ return (temp);
}
```

Figure 8

File Maintenance Data Structures

```
struct FileBlock {
UInt32              Index;          /* Used at init */
MemBlock            *MemBlockPtr;   /* pointer */
struct FileBlock    *NextFileBlock; /* pointer */
} FB;

struct FileName {
char_array          *Filename;      /* pointer */
char_array          *Owner;         /* pointer */
char_array          *Group;         /* pointer */
Int16               Permissions;
Int16               Attributes;
Date                Modified;
struct FileName     *NextFile;      /* pointer */
Int16               NumBlocks;      /* optional */;
FB                  *FileBlockPtr;  /* pointer */
} FN;

struct Directory {
char_array          *DirName;   /* pointer */
Int16               NumFiles;   /* optional */
FN                  *Files;     /* pointer */
struct Directory    *Sibling;   /* pointer */
struct Directory    *Child;     /* pointer */
struct Directory    *Parent;    /* pointer */
} DIR;

struct MemList {            /* optional structure */
MB                  *MemBlock;      /* pointer */
struct MemList      *nextML    /* pointer */
} ML;
```

Figure 9

Internal Directory Structure
(Prior Art)

Internal Directory File Structure

FileBlock to MemBlock Mapping

Simplified View of File System

Arrows indicate links and direction

```
/* Function NewFileBlock()  Gets a new FileBlock and grabs the first
MemBlock on the free list.  Assumes that new FileBlock requires a
MemBlock and obtains one. */

FileBlock_Pointer     NewFileBlock()
{
FileBlock_Pointer     new;

/* First, get the new FileName program object.  If an error occurs,
set an error variable.  If successful, attempt to get a free
MemBlock.  If the MemBlock attempt fails, set an error value and
free the FileBlock. */ if (new = (FileBlock_Pointer)malloc(sizeof(FileBlock))) == NULL) {
    errno = OUT_OF_MEMORY;
    }
else{
    if (new.MemBlockPtr = GetFreeMemBlock()) == NULL) {
        errno = MEM_BLOCK_FAIL;
        free (new);
        new = NULL;
        }
    }

/* Return the pointer to the new FileBlock.  If the return value is
NULL, an error is indicated. */ return (new);
}
```

Figure 14

```
/* Function FreeFileBlock()  Frees the FileBlock and its associated
MemBlock. */ include "filesys.h"

void          FreeFileBlock(FileBlock)
FileBlock_PointerFileBlock
{
FreeMemBlock(FileBlock.MemBlockPtr);
free (FileBlock);
}
```

Figure 15

```
/* Function MemBlockWrite()  Writes to a MemBlock.  If successful
returns NULL and takes care of under used data space.  If not
successful, returns a pointer to the remainder of the data.
Assumptions: 1.) Function InitDP() initializes data port with
address and command. 2.) Function WriteDP() writes a stream to the
data port. */

BOOLEAN             MemBlockWrite(
MemBlock_Pointer        MemBlock;
character_array         buffer;
integer             elementsize)
{
MemBlock_Pointer tempMB;
integer             counter,max,pages,length;

/* Test for free leading or trailing MemBlock and combine if free */ if (MemBlock.PreviosMemBlock.Free) {
    MemBlock = CombineMemBlocks(MemBlock.PreviousMemBlock,MemBlock);
    }
if (MemBlock.NextMemBlock.Free) {
    MemBlock = CombineMemBlocks(MemBlock,MemBlock.NextMemBlock);
    }

/*  Initialize counters and determine maximum elements that can be
written to the memory area indicated by the MemBlock program object.
*/ counter = 0;
max = MemBlockLength(MemBlock) * BYTES_PER_PARAGRAPH / elementsize;

/* Initialize the Data Port */ initDP (WRITE,MemBlock.StartPage,MemBlock.StartOffset);
```

Figure 18a

```
/* Function MemBlockWrite()   Continued */

/* While the current buffer element is not the end of file mark and
while there is still room in storage, write data elements.
Increment the counter and the buffer pointer at each iteration.  */ while (buffer != EOF && counter++ <= max) {
    WriteDP(buffer++)
    }

/* If there is room left over in storage space, compute the actual
usage and then call SplitMemBlock and free the new MemBlock. */ if (counter < max) {
    max = counter * elementsize / BYTES_PER_PARAGRAPH
    pages = max / PAGESIZE;
    length = max % PAGESIZE;
    tempMB = SplitMemBlock (MemBlock,pages,length);
    FreeMemBlock (tempMB);
    }

/* If we are done, then return NULL to indicate completion. */ if (counter <= max) return (NULL);

/* If we are not done with data, return the current position
pointer. */ else return (buffer)
```

Figure 18b

```
/* Function PortWrite ()  Returns 0 on successful completion, Return
-1 on error.  Implements portion of reverse optimization.

Assumptions:
1.  The file already exists (has been created).
*/ include filesys.h integer     PortWrite (FileName,buffer,elsize)
FileName_Pointer FileName;
character_pointerbuffer;  /* Pointer to buffer  */
integer     elsize;  /* Buffer element size   */

{
FileBlock_PointerworkFB;
FileBlock_PointertempFB;
MemBlock_Pointer workMB;
integer     counter,max,pages,length;

/* First, determine the working FileBlock.  If none exists, get one
and attach it to the FileBlock program object. */ workFB = FileName.FileBlockPtr;
if (workFB == NULL) {
    workFB = NewFileBlock();
    FileName.FileBlockPtr = workFB;
    }

/* Now determine the working MemBlock. */ workMB = workFB.MemBlockPtr;
```

Figure 19a

```
/* Function PortWrite ()  Continued */

/* Until MemBlockWrite returns a NULL to indicate completion, write
to the MemBlocks.  If the return value is not NULL, set workFB to
the next FileBlock in the linked list.  If an additional FileBlock
does not exist, create one and add it to the list.  If the creation
fails, set an error value and return -1 to indicate an error.  Once
a new FileBlock is addressed, set workMB to the MemBlock indicated
by the new FileBlock. */ while ((buffer = MemBlockWrite (workMB,buffer,elsize)) != NULL) {
    if (workFB.NextFileBlock == NULL) {
        if ((workFB.NextFileBlock = NewFileBlock()) == NULL)
            {errno = OUT_OF_MEMORY;return (-1);}}
    else workFB = workFB.NextFileBlock;
    workMB = workFB.MemBlockPtr;
    }

/*  Check for and kill any extra FileBlocks.  This is a part of the
optimization process, (both leading and trailing edge). */ while (workFB.NextFileBlock != NULL) {
    tempFB = workFB.NextFileBlock;
    workFB.NextBlock = tempFB.NextFileBlock;
    FreeFileBlock (tempFB);
    }

/* The operation was good if this point reached.  Return 0 to
indicate success. */ return (0);
}
```

Figure 19b

Data Port Memory Map
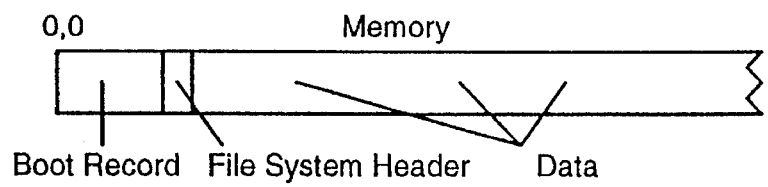
Figure 20
File System Header
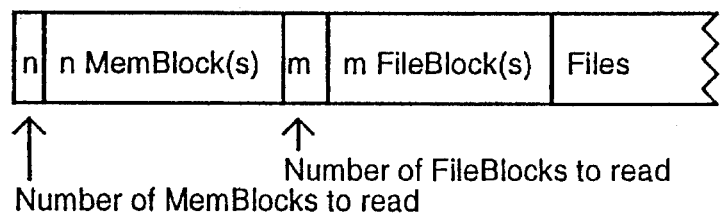
Figure 21
| File | Directory | Maintenance |
|---|---|---|
| Create | Create | BackupSystem |
| Open | Open | RestoreSystem |
| Write | Change active | SyncSystem |
| Read | List Files | Optimize Storage |
| Close | Delete | Generate Free list |
| Change attributes | | Generate used list |
| Delete | | |
| Link | | |
| Move | | |
| Restore | | |
Figure 22

```
/* Funtion PortCreateFile() is used to create a data port file
system file.  A FileName program object is created.  No FileBlocks
are required at this time as the file has not been written to
storage. */

FileName_Pointer      PortCreateFile(
chararacer_pointer    filename,
Integer               mode)
{
FileName_Pointer      old,new;
extern DIR_Pointer    CWD;       /* Maintained internally */

/*  Check to see if "filename" exists" by doing a string compare of
existing files against the new file name.  If the file already
exists, return NULL to indicate an error has occurred. */ old = CWD.Files;
while (old != NULL) {
    if (strcmp(old.Filename,filename) {
        return (NULL);
        }
    }

/* Create FileName data structure and link to directory list of
files.  Set file permissions and attributes as required, copy file
name.  Return pointer to the new FileName program object. */ new = (FileName_Pointer) malloc (sizeof(FileName_Pointer));
old = CWD.Files;
while (old.NextFile != NULL) old=old.NextFile;
old.NextFile = new;
new.permissions = mode;
new.attributes = DEFAULT_ATTRIBUTES;
strcpy (filename,new.Filename);
new.NumBlocks = 0;              /* Optional */
return (new);
}
```

Figure 23

Free and Used Lists Using Existing MemBlocks

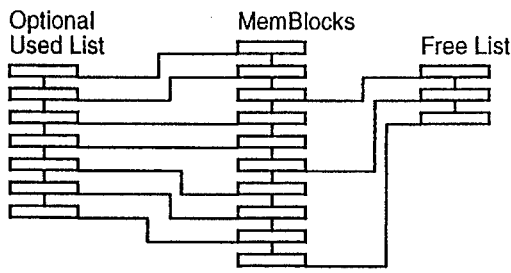

Figure 24

```
/* Function GetStorageList() builds a linked list of MemBlockList
program objects of the same status type, either free or used. The
desired status is indicated in the passed parameter, "mode". */

MemBlockList_Pointer GetStorageList(
Boolean          mode)

{
MemBlockList_Pointer      first,working,new;
MemBlock_Pointer          mb;
extern MemBlock_Pointer   MemBlockHead;

/*   Setup        */ mb = MemBlockHead;
first = NULL;

/* Build the list by traversing the multiply linked list of MemBlock
program objects.  Because the end of the MemBlock linked list is
indicated by a NULL pointer, loop until NULL is encountered. */ while (mb != NULL) {

/* If a MemBlock of the desired status is indicated, create a new
MemBlockList program object and add it to the list.  The very first
MemBlockList program object must be placed at the first of the list.
Test for a NULL value for first.  If found, then the new MemList
program object goes at the head of the list.  If not, add the new
MemList program object to the end of the list.  Track the last
member of the list with the "working" pointer. */ if (mb.Free == mode) {
    new=(MemBlockList_Pointer)malloc(sizeof(MemBlockList_Pointer));
        if (first == NULL) {
            first = working = new;
            first.MemBlock = mb;
        else {
            working.NextML = new;
            working.MemBlock = mb;
            working = new;
            }
        }

/* To check the next member of the MemBlock multiply linked list,
set the variable "mb" to the next MemBlock and re-enter the loop. */ mb = mb.NextMemBlock;
    }

/* When the list is completed, return the pointer to the first
MemList program object in the list. */ return (first);
}
```

Figure 25

Free and Used Lists using New MemBlocks
Illustrating Relationship to Existing MemBlocks

Division of File System Maintenance
In SmartPort DataPort System

METHOD AND SYSTEM FOR MAXIMIZING DATA FILES STORED IN A RANDOM ACCESS MEMORY OF A COMPUTER FILE SYSTEM AND OPTIMIZATION THEREFOR

BACKGROUND OF THE INVENTION

This invention pertains to the field of computer data storage, and in particular to file systems for efficiently maintaining data files stored in a random access memory. It further pertains to methods of automatic optimization in a computer file system.

Sector Size

Heretofore, the trend in computer systems data storage has been to compact data on physical magnetic media in order to enable larger storage volumes. One example of this trend is the growth of sector size. The first magnetic media disk drives usually had 128 bytes per sector. Today it is common to find 512 or 1024 bytes per sector. Recent technological advances allow 4096 bytes per sector. Research is under way that will further increase the size of a sector.

File system mechanisms

Heretofore, computer operating systems have used a mechanism by which one or more disk sectors am addressed as a single cluster or block of disk sectors. Typically, four or more sectors are addressed as a single cluster or block. For example, MS-DOS will usually combine four contiguous sectors of a hard disk with a 512 byte sector size into a single 2048 byte cluster. Under UNIX a cluster is called a disk block and a common size for a single disk block is 4096 bytes. In this application, I define a cluster as any one or more associated disk sectors.

When a file is stored, is occupies one or more clusters. On average, the last cluster used will be only half full. The remainder of the cluster is unused and is not available for storage. The unused portion of the cluster is wasted storage space.

A large cluster size is usually selected to enhance system disk access performance. The larger the block of data that can be extracted or written during a given operation, the fewer operations are required to perform a given task. The majority of time delays in a disk system is associated with the protocols involved in the operation performed. Increasing the size of a transfer operation reduces the number of operations that need be accomplished to transfer a file of a given size, and therefore the time required.

An operating system defines a cluster size and then maps the sectors of a disk into the clusters. The definition of cluster size allows the operating system to address disks of differing sector size and provides a universal mapping mechanism. For example, a 2048 byte cluster may have four 512 byte sectors or two 1024 byte sectors depending on the sector size of the disk. In the ideal situation, a cluster will map to a single sector so no sectors are left unused. For example, a 4096 byte disk cluster (block) under UNIX could map one-to-one with a disk that has a 4096 byte sector.

In an idealized file structure in which a cluster maps to a single sector, it can be demonstrated that the larger the sector size, the more unused physical media, mechanical or electronic. When a data file is stored, the last sector of the file is usually only partially filled. In fact, it is extremely rare for the last sector to be completely full. The file length must be an exact multiple of the sector size if there is to be no wasted storage space.

Heretofore, disk oriented file systems have required the central processing unit to perform multiple table look-ups, address computation and data transfers. This need is mandated by the fixed length of the storage media compounded by the mechanical characteristics of the disk drive. When a file operation is initiated, the central processing unit must obtain the absolute address of the file by accessing a look up table which may reside in main memory or on the disk itself. After obtaining a block address, the central processing unit must issue a command for the block of disk space to be accessed. This action must be repeated for each block of disk space regardless of sequencing. The operations are performed in a loop that repeats itself until the operation is completed.

Heretofore, semiconductor data storage media has been accessed in a manner that emulates a spinning media disk drive. File systems were designed to minimize the impact of the mechanical limitations of spinning media and to address the media in an economical manner. The paradigm used to address spinning media has been applied to semiconductor storage. To this end, recent memory product announcements have been made that provide block erase capability in spinning media sector size blocks. A reevaluation of the paradigm in light of the capabilities of semiconductor media shows that the paradigm is no longer valid.

Heretofore, flash memory storage file systems, such as Microsoft's Flash File System, have address the issue of wasted storage space by implementing a singly linked list wherein a status byte signifies whether an entry is a file or a directory. When a file is requested, the list is searched from the head until the file is found or the end of the list is reached. For directory entries, child and sibling pointers are maintained. Entries are added to the list sequentially.

When a file is deleted by the user, the entry for the file cannot be deleted as the linked list would be broken. The file system cannot maintain a "current position" for the user. File data is interleaved with the directory information and is thus not centrally located nor easily accessed. Finally, any and all modifications of the file system structure require that a copy of the file system, including data, must be made, the modifications made to the copy and the new file structure and data re-stored in flash ram. Sometimes this copy is made and operated upon on floppy disk, a very slow interface.

U.S. Pat. No. 4,791,564 to Takai discloses a random access memory file apparatus for a personal computer with an external memory file. This patent discloses providing an external memory file comprising random access memory, in addition to the user system RAM. Files are transferred from a floppy disk into the external memory file for use by the CPU in a random access fashion. After modification in the memory file RAM, the files are written back into the floppy disk in the usual serial access format. The external memory file RAM also is used to provide a printer spooler. In the memory file RAM, the first sector comprises an address map. Subsequent sectors may contain essentially data only, on contradistinction to the conventional floppy disk formatting in which directory information such as file names and attributes are interspersed at the beginning of the corresponding data.

U.S. Pat. No. 4,792,896 to Maclean et al discloses a storage controller emulator which is used to provide transparent resource sharing in a computer system. This patent teaches a microprocessor controlled mass storage controller which acts as an interface for mass storage device shared by a plurality of otherwise stand-alone microcomputer systems.

The mass storage controller provides a common interface to each of the microcomputer systems which emulates the standard interface expected with respect to an internal floppy disk drive for example. This allows multiple users to share data without modifying their microcomputer system software or hardware. It further allows for standard single user software to be used without modification in a shared resource network environment. Maclean et al disclose hardware to accomplish the described functionality, but do not address the file system itself.

U.S. Pat. No. 4,896,262 to Wayama et al discloses a system for providing semiconductor mass memory in a computer system. It discloses emulation hardware for converting data and address information between a magnetic disk memory format and a semiconductor memory format, so the data may be transferred between a computer and a semiconductor storage device at relatively high data transfer rates without modifying the computer system which is configured in a magnetic disk access mode. The disclosure also provides for synchronization of data transfer, error correction, and multi-port access for use in a multi-computer system previously configured in a magnetic disk access mode. In the same vein, U.S. Pat. No. 4,456,971 to Fukuda et al is directed to a semiconductor RAM that is accessible in magnetic disk storage format. These patents essentially are directed to hardware for converting address data and translating command signals for emulating a magnetic disk memory.

Another recent patent directed to solid state emulation of rotating media memory devices is U.S. Pat. No. 4,958,315 to Balch. In this system, emulation is accomplished by multiplexing an offset memory address during each bit time. Nonvolatile memory arrays translate the memory address to an offset address that is proportional to the odd modular track length of the multiple or single head track. An emulation address controller is used to generate timing and initial addresses. In the Fukuda et al patent discussed above, an address synthesizer is coupled to track and sector address registers and also to a counter for synthesizing a RAM address signal.

The need remains for a more efficient file system to speed file transfer operations and for optimal use of memory space. The need also remains for automatically reorganizing a file system to recapture newly available memory space, and for automatically reassembling fragments in the file system.

SUMMARY OF THE INVENTION

The invention includes a series of novel file system data structures for creating and maintaining a computer file system. It further includes methods of automatically optimizing the file system to maximize data file storage in a memory. Another aspect of the invention comprises an improved file system for fast and efficient file transfer operations. The improved file system includes a plurality of linked lists of data objects to maintain file name, directory, storage locations and free and used memory blocks.

The preferred embodiment of the invention includes program code that is operating system and platform independent, and a method for storing the file system on a memory subsystem. The program code provides a mechanism by which encoded data may be read from the random access memory subsystem and used to construct several linked lists of program objects. The preferred embodiment of the invention uses object oriented programming techniques to maximize performance and minimize required storage space.

In one embodiment of the invention, a file system program is added to an operating system and is run on the central processing unit in the conventional manner. Alternatively, program execution may be divided between the central processing unit and a second processing unit coupled to the memory subsystem.

Another aspect of the invention is to store file directory information in variable length program objects whose length is determined by the number of file entries and sub-directories associated with the file directory.

BRIEF DESCRIPTION OF THE DRAWINGS

FIG. 1 demonstrates the ability of the invention to more effectively use available memory subsystem for data storage.

FIG. 2 is a pseudo code example of a MemBlock program object.

FIG. 3 illustrates the initial MemBlock multiply linked list with no files stored.

FIG. 4 illustrates the MemBlock multiply linked list with a single file of 72,345 bytes length stored.

FIG. 5 is a pseudo code example of a function used to create new memory block program objects.

FIG. 6 is a pseudo code example of a function used to set the state of a MemBlock to free. Note that the function examines neighboring MemBlock program objects to see if they are in the free state and if so, combines them. This combining is a part of the automatic optimization process.

FIG. 7 is a pseudo code example of a function used to combine neighboring MemBlock program objects.

FIG. 8 is a pseudo code example of a function used to inquire the size in paragraphs of the block of memory associated with a MemBlock.

FIG. 9 shows the data structures used in file maintenance.

FIG. 14 is a pseudo code example of a function used to create a new FileBlock program object.

FIG. 15 is a pseudo code example of a function used to free a FileBlock program object. Note that in this case, free is not a state but a removal.

FIG. 18 is a pseudo code example of a function used to write information to the memory space associated with a single MemBlock program object. The function implements both leading and trailing edge file system optimization. The function is an internal lower-level function and is not available to application programmers.

FIG. 19 is a pseudo code example of a function used to write a file to the data port. This is the function that will be used by application programmers to store files on the data port. The function implements a portion of the automatic optimization process.

FIG. 20 shows an example of how the boot record and file system header would be mapped to data port memory.

FIG. 21 illustrates the two parts of the file system header. The first part is for MemBlock program objects and the second for FileBlock program objects that represent the entire file system structure.

FIG. 22 is a table of some high-level file system functions categorized by class of function.

FIG. 23 is a pseudo code listing of the create file function as it would be implemented using an example.

FIG. 24 illustrates the relationship between the free and optional used lists composed of MemList program objects and the multiply linked list of MemBlocks.

FIG. 25 is a pseudo code listing of a program used to generate the free and optional used lists.

DETAILED DESCRIPTION OF THE PREFERRED EMBODIMENT

Figure 10:
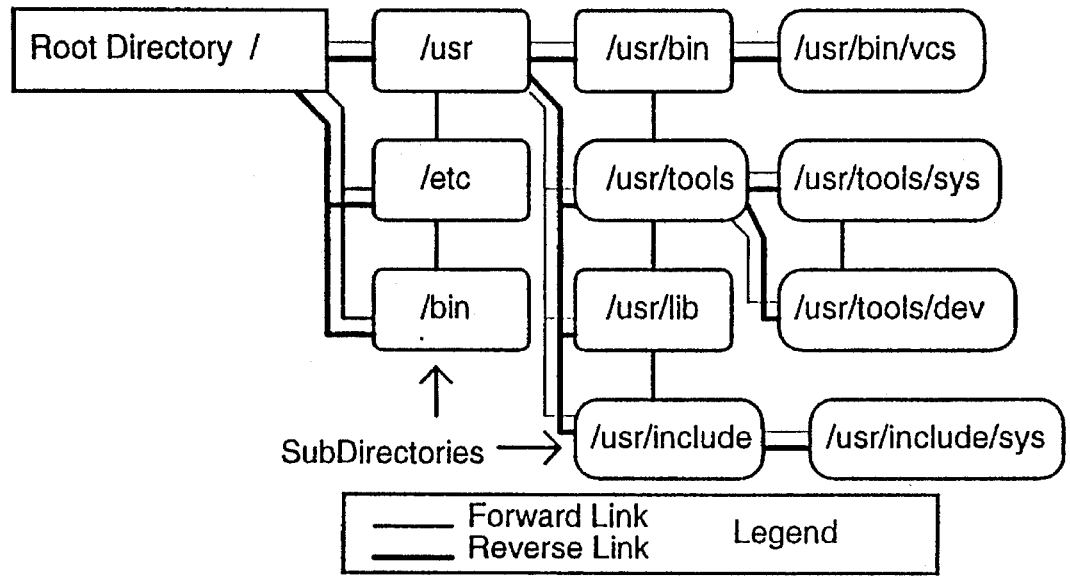
FIG. 10 illustrates the internal directory structure with forward and reverse links.

For convenience sake, let us equate a memory subsystem's data paragraph to a disk sector and let us assume that a data paragraph contains eight bytes of data. Using this definition, the memory subsystem could be said to have an eight byte sector. If a sector size of 8 bytes and is compared to a 512 byte sector in storing a file of 518 bytes, the device with a 512 byte sector will waste 506 bytes of the second sector while the invention with an 8 byte sector will waste 6 bytes of the 65th sector as illustrated in FIG. 1. Note also that many more file lengths will be a multiple of 8 than of 512. Because the invention uses very small data paragraphs, less physical media is unused by the operating system.

Memory Maintenance

Memory subsystem block status and use are controlled and indicated by using a MemBlock data structure as illustrated in FIG. 2. 16 bit unsigned integers (UInt 16) are used to indicate page and offset information. If we assume that the memory subsystem uses an eight byte data paragraph and that a page consists of 65,536 (64 KB) data paragraphs, then a single page represents 524,288 bytes of storage (512 KB). 65,536 available pages provides the invention the ability to construct a 32 GB (34,359,738,368 bytes) file system. If 32 bit unsigned integers are used to indicate page and offset information, then a page would consist of 4,294,967,296 paragraphs which could store 34,359,738,368 bytes (32 GB). Because there are 4,294,967,296 (4 G) pages, the file system would be able to address 147,573,952,583,676,412,928 bytes (147,573,952 TB or 147,473,952,583 GB).

To compute the size of the file system, the following equations are used:
Paragraph=$2^y$ bytesPage=$2^n$ paragraphs=$2^n * 2^y$ bytes System=$2^n$
pages=$2^n * 2^n * 2^y$ bytes
File System Size in bytes=$2^{2n+y}$ Therefore, a 16 bit file system addressing scheme with 8 byte paragraphs would address $2^{16} * 2^{16} * 2^3 = 2^{35}$ bytes. A 32 bit file system addressing scheme with 8 byte paragraphs would address $2^{32} * 2^{32} * 2^3 = 2^{67}$ bytes. Note that by changing the paragraph size or the size of the addressing scheme indicators, the total file system size changes. A paragraph may consist of one or more system words.

Refer again to FIG. 2. The StartPage variable indicates the starting page address for the memory block. The StartOffset variable indicates how far into the page the block begins. The BlockPages variable indicates the number of complete pages contained in the memory block. The LastPageLength variable indicates how far into the last page the memory block extends. BlockPages and LastPageLength are measured as offsets from the starting address and are thus relative rather than absolute address indicators. The BytesLastParagraph variable indicates how many bytes of the last paragraph are used. The NextBlock variable is a pointer to the next memory block in the doubly linked list. The PreviousBlock variable is a pointer to the previous memory block in the doubly linked list.

Initially, when the memory subsystem is first formatted, a single MemBlock structure indicates that the entire memory subsystem is available. For example, if the memory subsystem contains 64-MB of available storage, then the contents of the sole MemBlock structure would be as illustrated in FIG. 3. BlockPages would be set to 128, (64M/512K), and LastPageLength set to zero. Free would be set to TRUE and IndexNumber set to 0. Both *NextBlock and *PreviousBlock are set to NULL to indicate that there is no MemBlock structures in either direction. When a search of the MemBlock doubly linked list is accomplished, the presence of the NULL pointer indicates the end of the list in the desired search direction.

If a file whose length is 72,345 bytes is stored, the resultant multiply linked list of MemBlock structures would appear as in FIG. 4. The file would occupy 9044 data paragraphs of the first page with 1 byte of the last paragraph used.

Memory Maintenance Operations

A. Creating and Splitting Blocks of Memory

When the memory subsystem storage is initially formatted, a single MemBlock program object is created that indicates the entire storage capability of the memory subsystem. Because no data has yet been stored, the MemBlock indicates that the memory area is free. When a file is created and then saved, the file will be written to the address indicated by first free MemBlock. When the file is written, one of three things will occur. (1) If the file to be saved is larger than available storage, the write will fail and the user notified of insufficient storage, as in current file system. (2) If the file is the same size as the memory block indicated in the MemBlock program object, the MemBlock will be marked as not free. (3) If the file is smaller than the indicated storage capacity, then a new MemBlock program object must be created to indicate the free storage while the existing MemBlock program object is used to indicate the used portion of the storage area.

Refer to FIG. 5 which is a pseudo code example of a function SplitMemBlock used to create and initialize a new MemBlock program object. The function SplitMemBlock is passed the address of the MemBlock to divide along with the number of pages and the length of the last page to be assigned to the existing MemBlock. A new MemBlock program object is created and its starting address computed. The original MemBlock is altered to indicate the new number of pages and last page length. The newly created MemBlock is assigned the remainder of the available storage by computing the number of complete pages and remainder as BlockPages and LastPageLength respectively.

Next, the multiply linked list is updated by inserting the newly created MemBlock program object between the original MemBlock and any following MemBlock. Next, a call to a function FreeMemBlock is made to mark the new MemBlock as free. Finally the function returns a pointer to the new MemBlock program object.

B. Function FreeMemBlock

Refer to FIG. 6. When a MemBlock program object indicates a portion of storage that does not contain data, it needs to be marked as free. The function FreeMemBlock is used to accomplish this task. The pointer to the MemBlock to be marked free is passed to the function. The function makes use of the multiply linked list of MemBlock program objects to check neighboring MemBlock program objects to see if they are marked as free. If they are, they are combined into a single MemBlock program object and the resultant MemBlock program object is marked as free.

C. Function CombineMemBlocks

Refer to FIG. 7. To combine two MemBlock program objects into a single MemBlock program object, the function CombineMemBlocks is called, passing it the pointers to the two MemBlocks to be combined. The program first verifies that the two MemBlocks are indeed neighbors and can be combined. If not, an error code is set and the function returns a NULL pointer to the calling program indicating an error has occurred. If the two MemBlocks are neighbors, they are ordered and then the combined length of storage memory indicated by the two MemBlocks is computed.

In computing the new length, the LastPageLengths of each MemBlock are added. The result is divided by the size of a page to determine if the combined length is greater than a single page. The result of the division is stored in a temporary variable which will now equal either one to indicate a result equal to or greater than a page or a zero to indicate that the result was smaller than a page. The temporary variable is added to the sum of the two MemBlock's BlockPages variables and the result assigned to the first MemBlock. The LastPageLength of the first MemBlock is then set to the combined length divided modulo the page size. Modulo dividing the combined length insures that if the combined length was larger than a full page, the result will be the remainder after removing the page size from the combined memory. Recall that the portion of the combined length equal to a page would be added as a page in the BlockPages variable.

D. Function GetMemBlockLength

Function GetMemBlockLength determined the size of storage memory represented by the MemBlock program object. Refer to FIG. 8, a pseudo code example to illustrate the function GetMemBlockLength is passed a pointer to the MemBlock of interest and the length in paragraphs of the storage memory represented is computed and returned to the calling program.

File Maintenance

File maintenance is accomplished using several data structures. Please refer to FIG. 9.

A. FileBlock Data Structure

The first data structure defined in FIG. 9 is called a FileBlock. The FileBlock data structure stores an index into the linked list of memory blocks. When initialized, the MemBlockPtr pointer is determined by accessing the MemBlock whose position in the multiply linked list of MemBlocks is indicated by the index. The pointer to the MemBlock is then stored. The index variable is used only during initialization and when the file system data structures are stored in the data port during a synchronization operation. If the file is fragmented, the NextFileBlock pointer references the FileBlock data structure containing the next memory block information. The last FileBlock data structure associated with a file has a NULL pointer value for NextFileBlock. When this structure is stored during synchronization, only the index value need be written to the storage media.

B. FileName Data Structure

The FileName data structure in FIG. 9 is used to maintain FileBlocks and associated MemBlocks and associate them with the name of a file. The file name is stored in a variable length character array. A pointer to the first FileBlock is stored in the FileBlockPtr variable upon initialization and a linked list of FileBlocks constructed. File access permissions for the owner, group and the system are stored in a Permissions variable. (Permissions are typically read-only and read-write for the owner, group and system.)

The Attributes variable stores information about the file status, such as, is it a hidden file, a system file, an executable file, an open file or has it been backed up since the last modification. The date and time of the last time the file was modified is stored in the Modified variable. Note that the data actually stored in the FileName data structure will depend upon the operating system under which the invention is implemented. Alterations, additions and deletions to and of these variables must occur to provide the operating system with the data that it expects.

The optional NumBlocks variable indicates how many FileBlocks are used to store the file. The NumBlocks variable is not needed by any operations and is included only as a convenience to simplify the a search for fragmented files. The FileBlockPtr pointer indicates the address of the first FileBlock. The NextFileName pointer points to the FileName data structure for the next file residing in the directory thereby forming a linked list of files associated with the directory. The FileSize variable is optional and stores the size in bytes of the file. The size of the file is easily computed, therefore, this variable is a convenience used only when a user wishes to find out the size of the file.

C. Directory Data Structure

The Directory data structure is used to store directory information. The name of the directory is stored in the DirName variable length character array. NumFiles indicates how many files are located in the linked list of files pointed to by the Files variable. NumFiles is optional and not required for any operation. A Directory pointer, Sibling, is used to indicate the next directory in a linked list of sibling directories of the parent directory. The Child Directory pointer is used to store a pointer to a linked list of child directories. The Parent Directory pointer is used to indicate the parent directory. If the directory is the root directory, the Parent variable is set to NULL. When traversing the directory tree, any time that NULL is encountered, the end of a branch or the root of the tree is indicated depending upon the search direction.

D. MemList Data Structure

To generate either a free or used list, a MemList data structure is introduced as one possible method. The MemList data structure is used internally to create a list of free or used MemBlocks. These lists are used when files are initially written to storage, have grown in size when rewritten, are deleted from storage, when reports on storage space are required and other similar operations. The MemList structure contains a pointer to a MemBlock and a pointer to the next MemList data structure in the singly linked list.

FIG. 10 illustrates a prior art data structure. The file system program always maintains a pointer to the root directory. The file system program also maintains a pointer to the current active or working directory, (CWD). From the root directory, the file system program can traverse the linked list of directories to any other directory. In FIG. 10, child directories are oriented horizontally and sibling directories are oriented vertically. From any directory, the file system program can traverse to the parent directory directly using the parent directory pointer. If a directory is indicated with a NULL pointer, the file system program has reached an end of the multiply linked list of directories.

Figure 11:
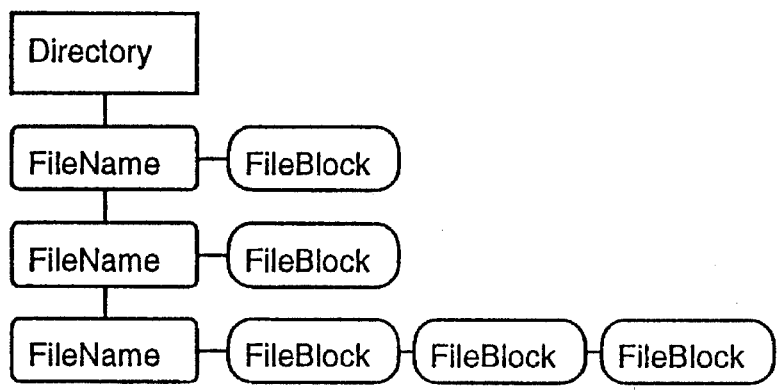
FIG. 11 illustrates the internal file structure where files are associated with a directory by linking the FileName program object to the Directory program object. Also illustrated is the linking of FileBlock program objects with the FileName program object.
Figure 12:
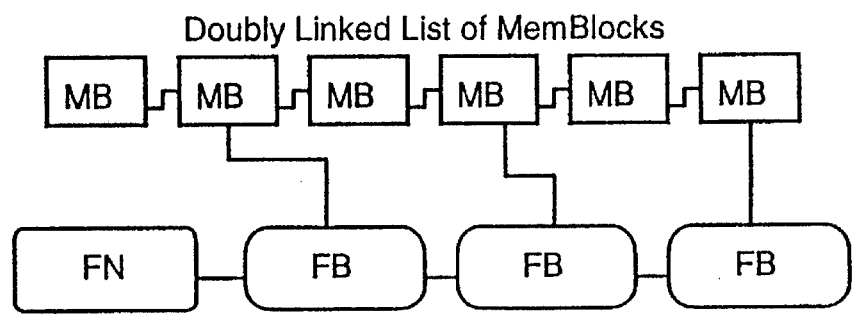
FIG. 12 illustrates how FileBlock program objects relate to MemBlock program objects.

FIG. 11 illustrates the internal maintenance of files according to the present invention. Each directory has a pointer to a linked list of filenames. The links are one way. Each FileName has a pointer to a linked list of FileBlocks. Each FileBlock data structure has a pointer to a MemBlock data structure as illustrated in FIG. 12.

Figure 13:
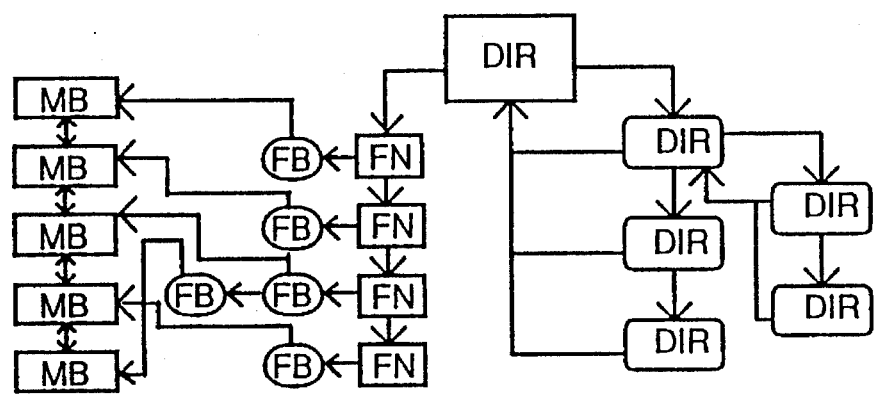
FIG. 13 shows the links found in a simplified view of the file system wherein only the root directory has any associated files and only one other directory has child directories.

A simplified view of the new file system is illustrated in FIG. 13. The file system program maintains pointers to both the first MemBlock and to the root directory data structures. Using these two pointers, any file name or location can be determined.

File Maintenance Operations

There are many file maintenance operations. We are concerned here only with a subset of those particular to FileBlock program objects. These basic functions permit a wide range of operations are key to the operation of the invention.

A. Function NewFileBlock

Refer to FIG. 14 pseudo code. FileBlock program objects must be created. Creation is accomplished by the NewFileBlock function. The function is called with no parameters. It first attempts to create a new FileBlock program object. If it fails, it sets an error code value and returns a NULL pointer to the calling program. If it succeeds it attempts to locate the first free MemBlock program object and assign it to the new FileBlock program object by calling a function called GetFreeMemBlock. If is fails, it releases the new FileBlock program object, sets an error code and returns a NULL pointer to the calling program. If it succeeds, it returns a pointer to the new FileBlock program object to the calling program.

B. Function FreeFileBlock

Refer to FIG. 15 pseudo code, etc. There are times when a FileBlock program object is no longer required. Some examples would be when a file is deleted or when a fragmented file is re-written, smaller and fits in the first MemBlock's indicated storage space. Note that if a FileBlock is no longer required to store a file, then the associated MemBlock program object is also no longer required. The function FreeFileBlock is passed a pointer to the FileBlock program object to be freed. The first thing to happen is that the MemBlock associated with the FileBlock is freed. Next the FileBlock data structure is released.

File Update Automatic Optimization

A. Leading Edge Optimization

Figure 16:
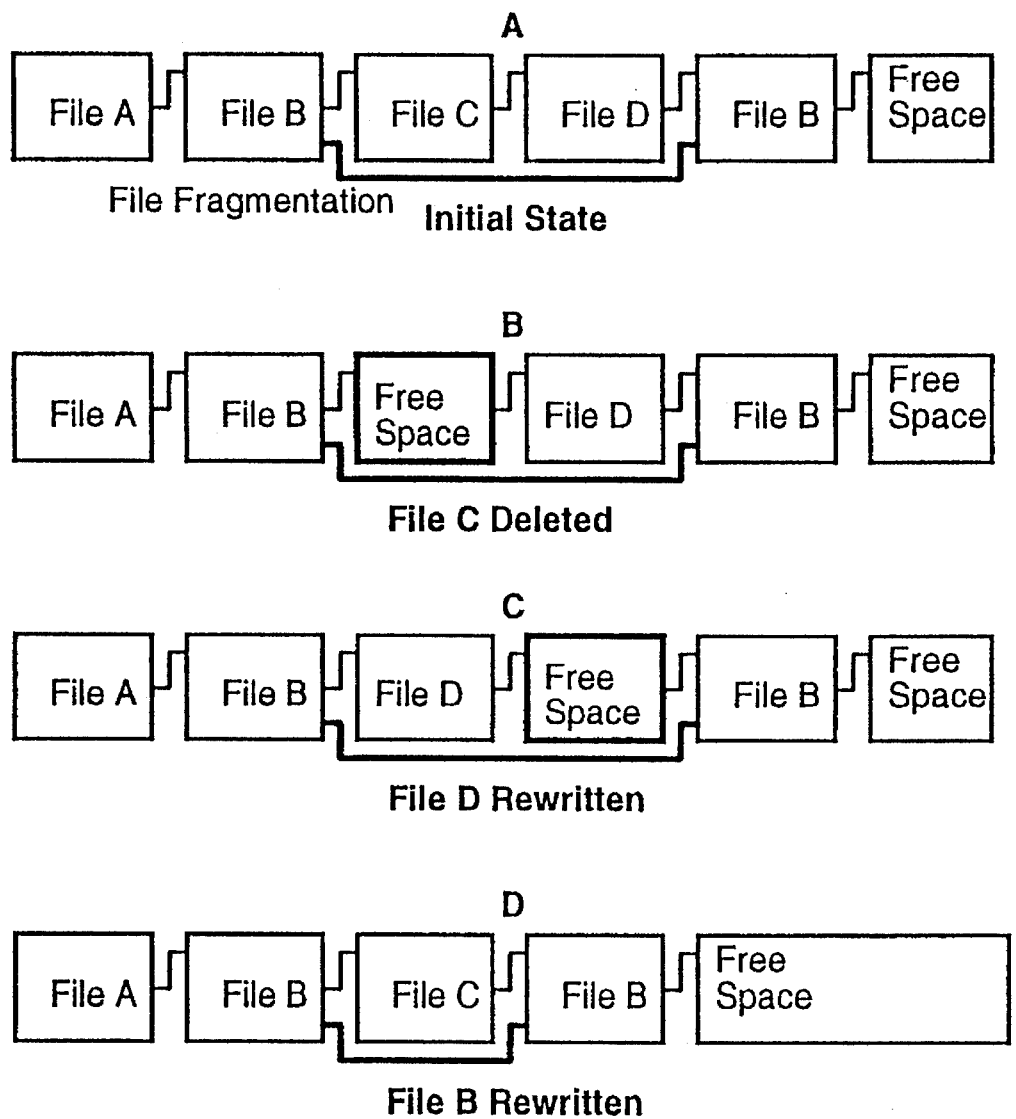
FIG. 16 illustrates how the file system will automatically perform leading edge file system optimization.

When a file becomes fragmented, it occupies more than one block of memory. In FIG. 16A, four files have been stored. File B was updated and the new copy was longer than the previous copy, thereby causing File B to become fragmented. Note that the dark line that indicates a connectivity between the two memory blocks associated with File B are imaginary and are actually implemented in the File Maintenance data structures. For the purpose of clarity in this discussion, let us assume that the links are as drawn.

In FIG. 16B, File C has been deleted. Because File C was located between two used memory blocks, a hole is left in memory space. Under today's file system mechanism, a hole in memory space will remain until a utility, such as a disk optimizer, is used to rearrange the sectors used by a file. However, with the advent of the invention, this need not be the case.

Refer to FIG. 16C. Assume that file D is updated. When file D is written during the update, the block of memory directly is front of where file D was stored is combined with the current block of memory and file D is written. The leading edge of the data to be written has advanced. When the file is completely re-written, a gap in memory space will appear and will be indicated by a free MemBlock.

Refer to FIG. 16D Let us assume that File B is again updated. When the second memory block of File B is to be written, the file system mechanism examines the memory block structure(s) directly "in front of" the memory block to be written to determine its free status. Because the previous memory block is free, the start of the second block of File B is advanced as far as possible. SplitMemBlock will be called to create a new free MemBlock.

When FreeMemBlock is called, the following memory block is examined, and because it is free, the two MemBlocks are combined. This process provides for a migration of files toward the front of the MemBlock list and an automatic optimization of storage space. This form of optimization is called leading edge optimization because it affect the leading edge of a MemBlock.

B. Trailing Edge Optimization

Figure 17:
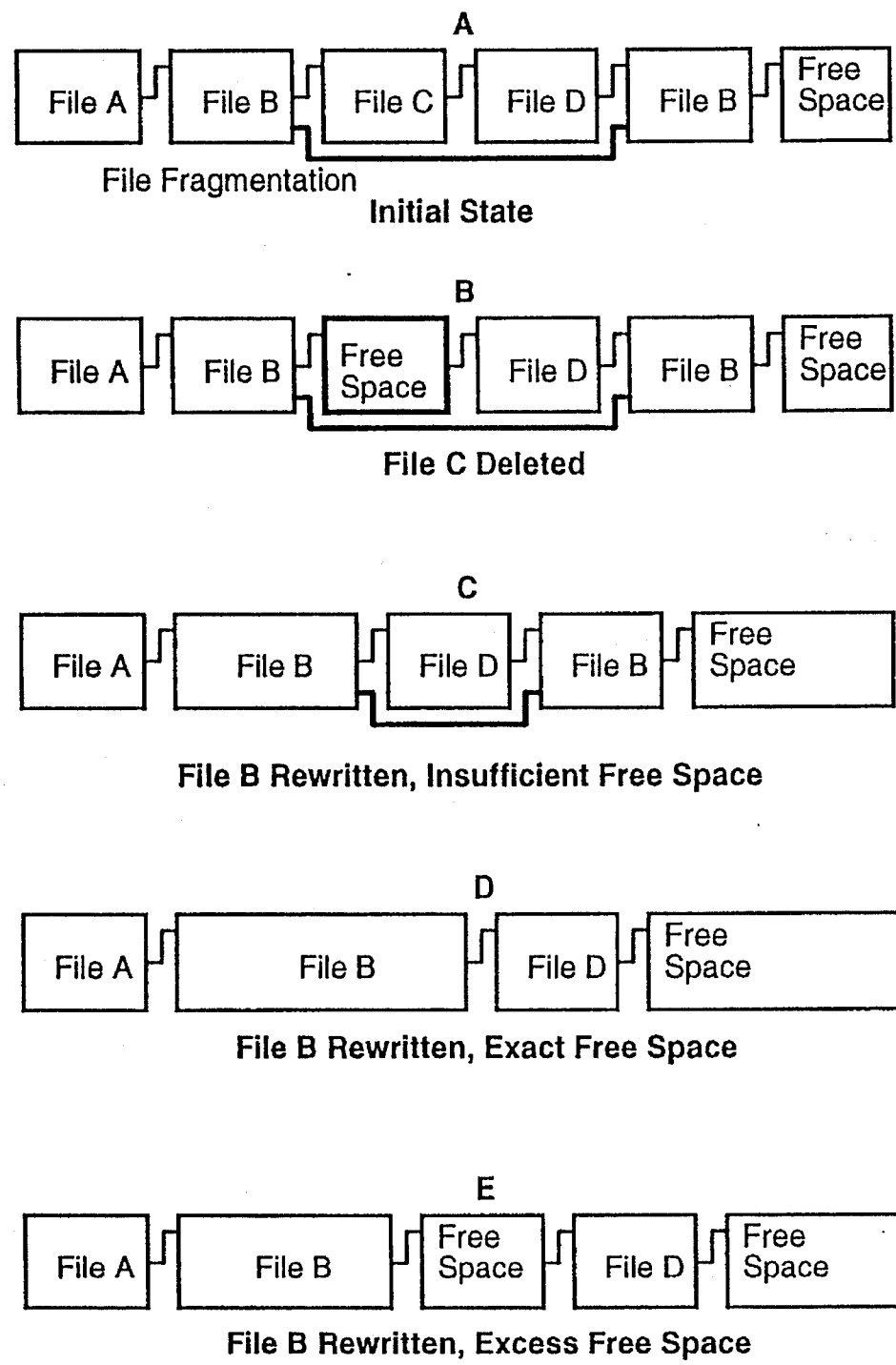
FIG. 17 illustrates how the file system will automatically perform trailing edge file system optimization.

Note that the above description is confined to free space prior to the file's memory block. The same construct is applied to free space following the MemBlock and is called trailing edge optimization. Refer to FIG. 17A. Four files have been written to the data port. File B was updated after it had grown in size and became fragmented. In FIG. 17B, File C has been deleted. A hole in memory space exists between the first memory block of file B and the memory block of file D. When file B is updated, the block of memory indicated by the first MemBlock of file B will be combined with the trailing free memory indicated by the free MemBlock. One of three things will occur. In FIG. 17C, the second memory block of File B was larger than the memory block freed with the deleted File C. The first block of memory associated with file B will grow and the second will shrink. In FIG. 6D, the second memory block of File B was the exact same size as the memory block freed with deleted File C, (a rare occasion). In FIG. 6E, the second memory block of File B was smaller than the memory block freed with deleted file C. The remainder of the free memory will be indicated by a MemBlock with status free.

C. Optimization Implementation

1. Function MemBlockWrite

Refer to FIG. 18, a pseudo code example of the MemBlockWrite function. This function relies on two lower level functions, PortInit which initializes the data port with command and address parameters and PortWrite which sends a stream of data to the data port. Note that the example pseudo code does not address different buffer sizes in full context but only for computation of the number of elements of the buffer to fit into the storage space. Implementation of the full context in terms of passed parameters is not difficult for one skilled in the art.

The first thing that MemBlockWrite does is to check for a free MemBlock program object in front of the addressed MemBlock by using the multiply linked list of MemBlock program objects. While prior MemBlocks are free, they are combined. This is the step in the process in which leading edge optimization occurs. Next, a check of the following MemBlock is made and if it is free, it is combined. This is trailing edge optimization. Once space optimization has occurred, the function then determines the number of items from the input buffer that will fit in the memory area represented by the MemBlock program object by calling GetMemBlockLength to determine the number of available paragraphs and then dividing the number of paragraphs available by the size, (in bytes) of the elements in the buffer to be written. Next, it multiplies this result by the number of bytes in a paragraph. The result is the number of elements that can be written to storage. The function then initializes the data port and begins to write until either the complete buffer is written or the number of elements is reached.

If the entire memory space indicated by the MemBlock program object is not consumed by the data, then the MemBlockWrite function computes the actual usage and passes the information to SplitMemBlock producing a new MemBlock program object and then frees the new MemBlock program object. This is the step in this program in which reverse optimization occurs, (further reverse optimization occurs in the PortWrite function, discussed below). If the data occupies less than or equal to the total available space, the function then returns NULL indicating that the write is complete. If there is remaining data to be written, then the MemBlockWrite function returns a pointer to the buffer indicating the next position of the buffer to write.

2. PodWrite

Refer to FIG. 19, a pseudo code illustration from the PortWrite function. This is the function that will be used by programmers implementing applications for systems that embody the invention. The previous function, MemBlockWrite is a lower level function implemented under the operating system and is not available to the application programmer.

In PortWrite, the calling program passes a pointer to the desired FileName program object, a pointer to the buffer to be written as the file and the size of the elements in the buffer. The PortWrite program first checks to see if a FileBlock program object is attached to the FileName program object. The presence of a FileBlock program object indicates that the file has been written previously. If no FileBlock program object is found, the PortWrite function calls the NewFileBlock function and attaches the new FileBlock program object to the FileName program object by embedding the pointer to the FileBlock program object into the FileName program object. PortWrite then assign a temporary variable to indicate the pointer to the FileBlock object.

PortWrite then begins to write to the memory subsystem by entering a loop that calls MemBlockWrite. Until MemBlockWrite returns a NULL value, succeeding FileBlock program objects are referenced from the linked list of FileBlock program objects attached to the FileName program object. If required, new FileBlock objects are created and attached to the linked list. If an error occurs, an error value is set and the PortWrite function returns a negative value to indicate the error.

When MemBlockWrite returns a NULL value, the write is accomplished. The PortWrite function then checks for residual FileBlock program objects calling FreeFileBlock for each found. Checking for and free of FileBlocks (and their attached MemBlocks) also are step in the optimization process.

Data Port Memory Map

The system must be able to store the entire file system hierarchy in an efficient manner. In addition, it must provide the computer system with a boot record with which the computer system can initialize itself. FIG. 20 demonstrates a linear view of the memory and shows how the boot record occupies the first block of memory at page 0, paragraph 0 (address 0,0). The size of the boot record is operating system dependent and will be of fixed size. Following the boot record and preceding the file storage area of the memory, a file system header of variable size is provided.

File System Header File

The file system header file is illustrated in FIG. 21. The first entry indicates the number of MemBlock data structures to be read in order to determine the location of the MereBlocks that contain all MemBlock information. Should the MereBlock information file be fragmented, there will be more than one MemBlock data structure to read. Usually, the system will be run in an optimized mode and there will be only one MemBlock data structure in the header file. Immediately following the MemBlock structures, an integer is stored that indicates the number of file blocks associated with the FileBlock information file. Again, usually there is only one such structure, but in case the FileBlock information file is fragmented, provisions for more than one FileBlock structure are present.

Because there may be fragmentation of the information, the file system header must provide for a minimum of 8 data structures per section. When the file system header is written to storage, and if the number of structures in either section reaches the maximum value, then the user should be advised to run a file system optimization program that is included in the file system maintenance tools along with backup and restore.

File System Synchronization

To accomplish file system synchronization, the multiply linked list of MemBlock program objects is traversed from start to finish assigning an incremented index value to each MemBlock program object. Next, the directory tree is traversed and all FileBlock program objects store the index value of the associated MemBlock program object. The multiply linked list of MemBlocks is then written into the file system header. The index value is not written as it is not required and not writing it saves storage space. Next, the directory tree is traversed and all objects written to storage. Included in the FileBlock program object is the index number.

Synchronization is required only when the invention file system is implemented solely under an operating system. When the invention is implemented in a local memory subsystem processor, the synchronization process is no longer required as the local intelligence will maintain synchronization on a continual basis.

File System Initialization

When the file system is to be initialized, (usually at power on time), the file system program reads the number of MemBlock structures to read and then reads them. Using the MemBlock structures, the file system program then reads in the complete MemBlock information contained in the listed MemBlock structures and forms the doubly linked list of MemBlocks. The file system program will always maintain a pointer to the first MemBlock structure in the doubly linked list.

Next, the number of FileBlocks that indicate the file system structure is read from the header and formed into a linked list. The file system program then reads the directory, file and FileBlock information for the complete file system from the indicated file blocks. For each FileBlock, the MemBlock multiply linked list is traversed comparing index numbers. When a match is found, the FileBlock program object discards the index and stores a pointer to the correct MemBiock program object. The file system will always maintain a pointer to the root directory which is at the head of the complete file system linked list.

Where the invention file system is implemented in memory subsystem local intelligence, the initialization process will be drastically reduced in complexity. The operating system will read the directory binary tree. Each FileName program object will store an index number rather than a linked list of FileBlocks. The operating system will be freed from maintaining, controlling and passing on file storage address information.

File System Operations

High level file system operations can be divided into several categories, file operations, directory operations and maintenance operations as illustrated in the table in FIG. 22. The table may not include all operations required to implement the invention under a specific operating system and should not be considered all inclusive for this reason. The method of implementation of the file operation programs should be obvious to those skilled in the art. In the interest of clarity and to demonstrate the simplicity of the required program code, several operations will be discussed. Note that all file system data structures discussed and to be discussed are incorporated into a single definition file entitled "filesys.h". The "filesys.h" file will also include data structures that are required to implement the file system under a given operating system.

Create File

When a file is created, as illustrated in pseudo code in FIG. 23, the FileName linked list is searched to see if a duplicate name already exists under the file systems interpretation of the current working directory (CWD). If the file exists, the user is notified and a NULL value is returned to indicate an error to the program. If the operation was a success, file information fields are initialized. The fields initialized are a function of the operating system requirements and will differ for each operating system. The example included in the pseudo code in no way specifies the actual implementation.

Note that the target directory is not necessarily the current active directory, but may be a directory specified in the filename. The example code does not implement this alternative method of directory specification, however, any person skilled in the art can envision the program code required to implement the alternative method. Note also that no test is made for a successful allocation of memory. These items are not included in the example to avoid complexity and confusion

Generate Free List

Free and Used lists may be generated using the MemList data structure such that each MemList data structure indicates a single MereBlock data structure of the specified state as illustrated in FIG. 24. The used list is not as important as the free list and is optional. The free list is accessed each time that a new block of free memory is needed, for example, the first time a file is written.

Refer to FIG. 25. The program "GetStorageList(mode)" searches all MemBlocks for those MemBlocks that are indicated by the Free element as equal to the input parameter "mode" where the mode is either true for free space or false for used space. A linked list of MemList data structures is produced and the first MemList data structure (the head of the list) is returned to the calling program. Using this one simple program, both free and used lists can be generated.

Figure 26:
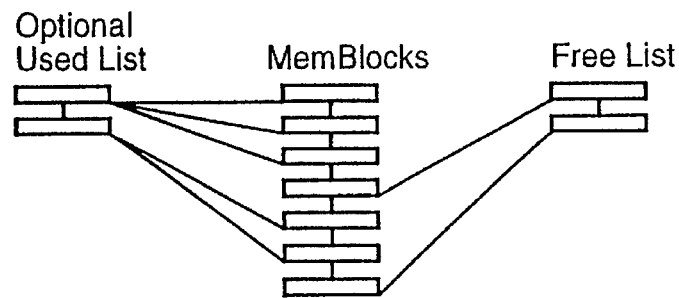
FIG. 26 illustrates the free and used lists implemented using MemBlock data structures and how those structures relate to the double linked list of MemBlocks.

Refer to FIG. 26. An alternative method that may prove to be more efficient, (depending upon the operating system), would be to create a linked list of MemBlocks that are constructed by summing all MemBlocks of a given state that are contiguous into a single MemBlock data structure. The new MemBlock structures would be part of and used by their respective list (free or used) only. Using this method, there is no need for the data structure type MemList and it need not be implemented. The drawback to this method of tracking free and used memory is that there will be a one-to-one relationship between free memory MemBlocks and the list of free MemBlocks. The advantage of this method is that it removes one level of indirection in the addressing and obtaining of information contained in free MemBlocks.

Delete File

When a file is deleted by the user, the MemBlocks associated with the file are freed. This does not alter the data stored. A linked list of deleted files can be provided for file recovery. When the file is deleted, the pointer to the FileName program object is removed from the linked list contained in the appropriate Directory program object. The FileName program object can then be added to an internally maintained linked list of deleted files. At this point, all file information is still accessible. As more files are deleted, the list can grow, however, as soon as any operation occurs in which data is written, the linked list of deleted files must be cleared as the stored information may no longer be valid. This drawback is not unique to the invention as all file systems suffer from this eventuality.

Recover File

If a file has been deleted by accident, the user may recover the file only if no write operation has occurred since the deletion. Unlike any other file system, the user may recover the file into any desired directory by merely changing working directories to the desired directory and then calling the recovery procedure. The recovered file will be attached to the linked list of files associated with the current working directory.

If a user deleted three files from a single directory, they could recover the three files into three different directories if they so desired. The effect would be similar to a MoveFile command in which a file is moved from one directory to another by removing the associated FileName pointer from linked list of FileNames contained in the first directory and adding it to the linked list of FileNames of the second.

File System Implementation

From the above examples, it has been demonstrated that the file system is composed of many data structures or objects and that the overall file system program is thus object oriented. While the examples have been illustrated using a pseudo language, the actual implementation is well suited for object oriented programming languages such as "C++."

There are two methods of implementation. The first implements the entire file system, (less boot record and header information), as an extension of the operating system wherein all programs run on the computer's central processing unit. The second implements the file system with intelligence on the data port where a the data port processor accesses a portion of data port memory to store and maintain all object information.

Figure 27:
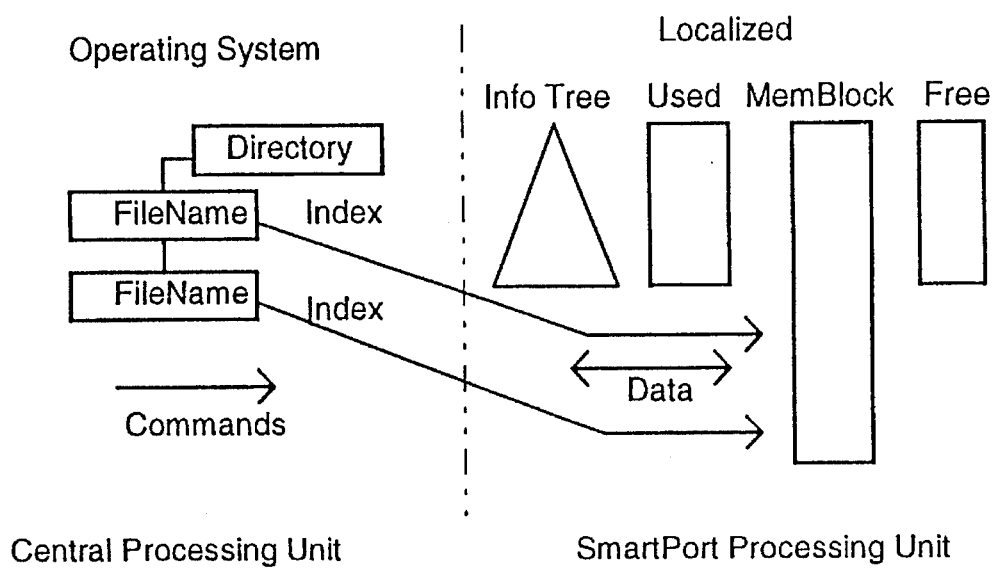
FIG. 27 illustrates the division of labor when data port local intelligence is used to maintain the low level file system information. The operating system need only maintain an abbreviated copy of the file system information with index values that are interpreted by data port intelligence.

Refer to FIG. 27. Upon initialization, the computer operating system constructs a binary tree of directories and files where the FileBlock data structure is replaced with an index number. Operating system file calls use the index number rather than address information. When a new file is created, the data port portion of the file system returns a new index number to the operating system version of the file system information. An advantage with this implementation is that the index numbers are relative and can be updated from one initialization to the next. Another advantage is that the intelligence on the data port can continuously optimize the stored data into single blocks invisibly to the operating system. The biggest advantage is that all file fragmentation and absolute address information is invisible to the operating system, a single call is used to load or write a file regardless of the file size.

While the above description contains many specificity's, the reader should not construe these as limitations on the scope of the invention, but merely exemplifications of the preferred embodiment thereof. Those skilled in the art will envision many other possible variations which are within its scope. Accordingly, the reader is requested to determine the scope of the invention by the appended claims and their legal equivalents, and not by the examples which have been given.

I claim:

1. In a computer system having a random access memory system, a method of maintaining computer files in the memory system comprising the steps of:

partitioning the memory system into pages of predetermined size;

partitioning each of the pages into data paragraphs of predetermined size, each data paragraph comprising at least one byte of memory: and dynamically formatting the memory system into a series of memory blocks of variable length, responsive to the size of each file stored in the memory system, each memory block consisting of at least one of the data paragraphs, located within one or more of said pages; wherein said dynamically formatting the memory system includes, for each file to be stored in the memory system;

creating a single memory block object;

storing an indication of the file starting location in the memory block object;

storing an indication of the file size in the memory block object; and storing in the memory block object a first pointer to a next one of a series of nonadjacent memory block objects, so that the memory block object defines a corresponding block of memory and the tint pointers in the series of memory block objects together form a first linked list of memory blocks;

wherein said indication of the file size includes:

a number of complete pages in the memory block (BlockPages);

a number of paragraphs that the memory block extends into the last page (LastPageLength); and a number of bytes used in the last paragraph of the memory block (BytesLastParagraph).

2. In a computer system having a random access memory system, a method of maintaining computer files in the memory system comprising the steps of:

partitioning the memory system into pages of predetermined size:

partitioning each of the pages into data paragraphs of predetermined size, each data paragraph comprising at least one byte of memory;

dynamically formatting the memory system into a series of memory blocks of variable length, responsive to the size of each file stored in the memory system, each memory block consisting of at least one of the data paragraphs located within one or more of said pages; and initially formatting the memory system by creating an initial memory block object, the initial memory block object indicating a starting location corresponding to a first end of the memory system space and a size equal to the size of the memory system.

3. A machine-readable file system memory block data structure encoding data about a corresponding block of memory in a physical memory system, said data structure comprising:

a StartPage integer variable indicating an address of a starting page for the memory block;

a StartOffset integer variable indicating a data paragraph offset into the starting page to a beginning of the memory block;

a BlockPages integer variable indicating a number of complete pages in the memory block, so that the StartPage and Blockpages variables together define an address of a last page of the memory block;

a LastPageLength integer variable for indicating an offset from the last page address to the end of the memory block;

a BytesLastParagraph integer variable for indicating a number of bytes of a last paragraph of the memory block;

a Free boolean variable indicating whether or not the memory block is available;

a NextMemBlock pointer to a second memory block for forming a forward linked list of a plurality of such memory blocks; and a PreviousMemBlock pointer to a third memory block for forming a reverse linked list of a plurality of such memory blocks.

4. A method of initializing a computer file system having a memory block data structure according to claim 3, the method comprising forming an initial memory block data structure, and in the initial memory block data structure:

setting the BlockPages variable equal to the size of the memory system;

setting the StartPage, StartOffset and LastPageLength variables all equal to 0;

setting the BytesLastParagraph variable equal to a predetermined paragraph size in bytes;

setting the Free variable to logical TRUE; and setting both the NextMeMBlock and PreviousMemBlock pointers equal to NULL for indicating the ends of the forward and reverse linked lists, respectively.

5. A method of storing a data file in a computer file system the data file having a predetermined size smaller than an initial memory block size, the method comprising:

first forming an initial file system memory block data structure encoding data about a corresponding block of memory in a physical memory system, the data structure including:

a StartPage integer variable indicating an address of a starting page for the memory block;

a StartOffset integer variable indicating an offset into the starting page to a beginning of the memory block;

a BlockPages integer variable indicating a number of complete pages in the memory block, so that the StartPage and Blockpages variables together define an address of a last page of the memory block;

a LastPageLength integer variable for indicating an offset from the last page address to the end of the memory block;

a BytesLastParagraph integer variable for indicating a number of bytes of a last paragraph of the memory block;

a Free boolean variable indicating whether or not the memory block is available:

a NextMemBlock pointer to a second memory, block for forming a forward linked list of a plurality of such memory, blocks: and a PreviousMemBlock pointer to a third memory block for forming a reverse linked list of a plurality of such memory blocks;

second, initializing the computer file system, said initializing step including in the initial memory block data structure;

setting the BlockPages variable equal to the size of the memory system;

setting the StartPage, StartOffset and LastPageLength variables all equal to 0;

setting the BytesLastParagraph variable equal to a predetermined paragraph size in bytes;

setting the Free variable to logical TRUE; and setting both the NextMeMBlock and PreviousMemBlock pointers equal to NULL for indicating the ends of the forward and reverse linked lists, respectively: and then storing the data file, said storing step including;

forming a second memory block data structure; and in the initial memory block data structure, setting the BlockPages variable equal to the number of complete pages of the data file;

setting the LastPageLength variable equal to an offset from the last page address to the end of the data file;

setting the BytesLastParagraph variable equal to a number of bytes of a last paragraph of the data file;

setting the Free boolean variable to FALSE to indicate the memory block is not available; and setting the NextMemBlock pointer to point to the second memory block data structure.

6. A method according to claim 5 further comprising:

computing a starting address of the second memory block data structure; and in the second memory block data structure, setting the StartPage and the StartOffset variables to reflect the second memory block starting address;

setting the BlockPages variable equal to a number of complete pages remaining available in the physical memory system;

setting the PreviousMemBlock pointer to point to the initial memory block dam structure; and setting the Free boolean variable to TRUB to indicate that the second memory block is available, thereby dynamically splitting the memory system into a first block, described by the initial memory block and containing the data file, and a second block, remaining available and described by the second memory block data structure.

7. In a file system having a plurality of memory block objects, a method of dynamically associating data files and corresponding blocks of memory for file maintenance the method comprising the steps of:

creating a filename object for each data file to be stored in the file system:

linking each filename object to a next subsequent filename object so that the filename objects together form a first linked lift:

creating a fileblock object for each block of memory in the file system;

linking each fileblock object to a corresponding memory block object; and linking each fileblock object to a next subsequent fileblock object so that the fileblock objects together form a second linked list, 8. A computer file system comprising:

at least one file name object, each file name object including a file name field and at least one additional field for indicating an attribute of the named file, the file name field including a string of data comprising a human-readable name;

a number of memory block objects at least equal to the number of file name objects, each memory block object including means defining a file starting location, means defining a file length and a first pointer to a next memory block object so that the memory block objects together form a first linked list of memory blocks in the file system;

each memory block object further including a second pointer to a previous memory block object so that the memory block objects together also form a second linked list of memory blocks inversely related to the first linked list:

the file name object further including a pointer to an initial one of the memory block objects to link the initial memory block object to the file named in the file name field:

at least one file block object, each file block object including a first pointer to a next file block object so that the file block objects together form a linked list of file blocks for associating fragments of a file; and each file block object further including a second pointer to a corresponding one of the memory block objects, thereby linking each file block object to a corresponding memory block for sequentially associating memory blocks containing fragments of the named file,

9. A computer file system comprising:

at least one file name object, each file name object including a file name field and at least one additional field for indicating an attribute of the named file, the file name field including a string of data comprising a human-readable name:

a number of memory block objects at least equal to the number of file name objects, each memory block object including means defining a file starting location, means defining a file length and a first pointer to a next memory block object so that the memory block objects together form a first linked list of memory blocks in the file system;

each memory block object further including a second pointer to a previous memory block object so that the memory block objects together also form a second linked list of memory blocks inversely related to the first linked list;

the file name object further including a pointer to an initial one objects to link the initial memory block object to the file named in the file name field wherein:

each of the file name objects includes a pointer to a next file name object so that the file name objects together form a linked list of file names for use as a directory to the file system.

* * * * *